United States Patent
Lin et al.

(10) Patent No.: US 9,513,861 B2
(45) Date of Patent: Dec. 6, 2016

(54) SYSTEMS AND METHODS FOR DISCOVERING WIRELESS DISPLAY DEVICES USING INAUDIBLE AUDIO SIGNALS

(71) Applicants: Xintian E. Lin, Mountain View, CA (US); Jie Gao, Sunnyvale, CA (US); Qinghua Li, San Ramon, CA (US); Narjala Bhasker, Portland, OR (US)

(72) Inventors: Xintian E. Lin, Mountain View, CA (US); Jie Gao, Sunnyvale, CA (US); Qinghua Li, San Ramon, CA (US); Narjala Bhasker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 14/128,001

(22) PCT Filed: Sep. 24, 2013

(86) PCT No.: PCT/US2013/061314
§ 371 (c)(1),
(2) Date: Dec. 20, 2013

(87) PCT Pub. No.: WO2015/047216
PCT Pub. Date: Apr. 2, 2015

(65) Prior Publication Data
US 2015/0220296 A1     Aug. 6, 2015

(51) Int. Cl.
*H04W 4/00* (2009.01)
*G06F 3/14* (2006.01)
(Continued)

(52) U.S. Cl.
CPC ........... *G06F 3/1423* (2013.01); *G06F 9/4445* (2013.01); *G09G 5/12* (2013.01); *H04M 3/567* (2013.01);
(Continued)

(58) Field of Classification Search
CPC ........ H04F 9/4445; G06F 3/1423; G09G 5/12; H04M 3/567; H04W 4/008; H04W 4/04
See application file for complete search history.

(56) References Cited

U.S. PATENT DOCUMENTS

| | | |
|---|---|---|
| 2006/0239208 A1 | 10/2006 | Roberts et al. |
| 2007/0080800 A1 | 4/2007 | Carbone et al. |

(Continued)

OTHER PUBLICATIONS

International Search Report and Written Opinion received for PCT Patent Application No. PCT/US2013/061314, mailed on Jun. 20, 2014, 10 pages.

*Primary Examiner* — Hassan Kizou
(74) *Attorney, Agent, or Firm* — Sutherland Asbill & Brennan LLP

(57) ABSTRACT

The present disclosure relates to computer-implemented systems and methods for wireless display discovery. The method may include receiving, by a computer, a selection to detect wireless display devices. The computer may include one or more processors, a radio transceiver, and a microphone. The method may also include identifying, by the radio transceiver, a plurality of wireless display device and transmitting, by the radio transceiver, respective connection requests to the plurality of wireless display devices. Additionally, the method may include transmitting, by the radio transceiver to the wireless display devices, respective requests for inaudible audio signal transmission. The method may also include receiving, by the microphone, a plurality of inaudible audio signals from the wireless display devices. Further still, the method may include determining, (Continued)

based at least in part on the plurality of inaudible audio signals, whether any of the plurality of wireless display devices are in the same room as the computer.

23 Claims, 4 Drawing Sheets

(51) Int. Cl.
  *H04M 3/56* (2006.01)
  *H04W 12/06* (2009.01)
  *H04W 76/02* (2009.01)
  *H04W 4/16* (2009.01)
  *H04W 8/00* (2009.01)
  *H04W 4/04* (2009.01)
  *G06F 9/44* (2006.01)
  *G09G 5/12* (2006.01)
(52) U.S. Cl.
  CPC ............. *H04W 4/008* (2013.01); *H04W 4/04* (2013.01); *H04W 4/043* (2013.01); *H04W 4/16* (2013.01); *H04W 8/005* (2013.01); *H04W 12/06* (2013.01); *H04W 76/023* (2013.01); *G09G 2370/022* (2013.01); *G09G 2370/16* (2013.01)

(56) References Cited

U.S. PATENT DOCUMENTS

| | | |
|---|---|---|
| 2009/0073942 A1 | 3/2009 | Qin et al. |
| 2009/0327467 A1 | 12/2009 | Cho et al. |
| 2010/0322387 A1* | 12/2010 | Cutler ................ H04M 3/2236 379/32.01 |
| 2012/0084131 A1* | 4/2012 | Bergel ............. G06F 17/30876 705/14.26 |
| 2012/0250576 A1 | 10/2012 | Rajamani et al. |
| 2014/0122656 A1* | 5/2014 | Baldwin ............. H04L 65/4084 709/219 |
| 2014/0164562 A1* | 6/2014 | King .................... H04W 8/005 709/217 |
| 2014/0323162 A1* | 10/2014 | Ezra ...................... G01S 5/0072 455/457 |
| 2015/0113094 A1* | 4/2015 | Williams ............... G06F 3/165 709/217 |

* cited by examiner

SYSTEMS AND METHODS FOR DISCOVERING WIRELESS DISPLAY DEVICES USING INAUDIBLE AUDIO SIGNALS

CROSS-REFERENCE TO RELATED APPLICATIONS

This application is a national stage filing under 371 and claims the benefit of priority of PCT/US2013/61314, filed Sep. 24, 2013, entitled "Systems and Methods for Wireless Display Discovery."

TECHNICAL FIELD

The present disclosure generally relates to wireless communication, and in particular communication with wireless displays.

BACKGROUND

The ability to wirelessly stream display information from a computer to a separate display device has been a recently growing trend. In the context of relatively large workspaces, such as an office building, multiple wireless devices (including multiple wireless display devices) may be dispersed over many rooms. As such, streaming display information to a particular wireless display device may involve manual input by a user to identify the particular wireless display. Such as discovery process may prove relatively time-consuming and tedious for the user.

BRIEF DESCRIPTION OF THE DRAWINGS

Reference will now be made to the accompanying figures and diagrams, which are not necessarily drawn to scale, and wherein.

DETAILED DESCRIPTION

Figure 1:
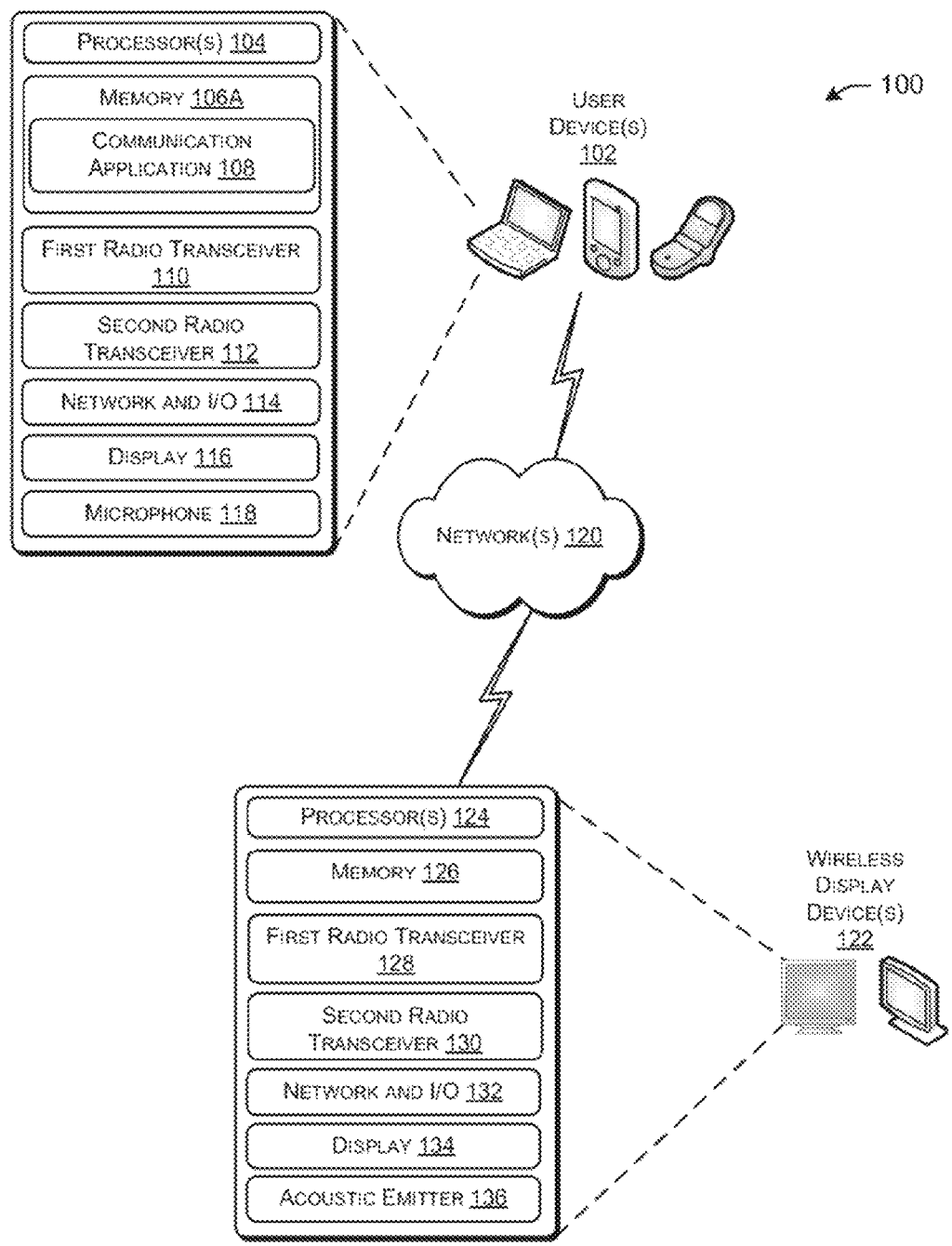
FIG. 1 shows a block diagram of a system for wireless display discovery, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

According to certain embodiments, the functionality provided by the receiver and the transmitter may be included in a single transceiver device.

The present disclosure relates to computer-implemented systems and methods for wireless display discovery. According to one or more embodiments of the disclosure, a method is provided. The method may include receiving, by a computer, a selection to detect wireless display devices. The computer may include one or more processors, a radio transceiver, and a microphone. The method may also include identifying, by the radio transceiver, a plurality of wireless display devices and transmitting, by the radio transceiver, respective connection requests to the plurality of wireless display devices. Additionally, the method may include transmitting, by the radio transceiver to the wireless display devices, respective requests for inaudible audio signal transmission. The method may also include receiving, by the microphone, a plurality of inaudible audio signals from the wireless display devices. Further still, the method may include determining, based at least in part on the plurality of inaudible audio signals, whether any of the plurality of wireless display devices are in the same room as the computer.

According to one or more embodiments of the disclosure, a device is provided. The device may include a radio transceiver and a microphone. The device may also include at least one memory for storing data and computer-executable instructions. Additionally, the device may also include at least one processor to access the at least one memory and to execute the computer-executable instructions. Furthermore, the at least one processor may be configured to execute the instructions to identify, by the radio transceiver, a first wireless display and a second wireless display from a plurality of wireless display devices. Additionally, the at least one processor may be configured to execute the instructions to request the first wireless display and the second wireless display to emit respective inaudible audio signals. The at least one processor may also be configured to execute the instructions to receive, by the microphone, the respective inaudible audio signals from the first wireless display and the second wireless display and determine, based at least in part on the respective inaudible audio signals, that the first wireless display is in the same room as the device.

According to one or more embodiments of the disclosure, a non-transitory computer-readable medium is provided. The non-transitory computer-readable medium may have embodied thereon instructions executable by one or more processors. The instructions may cause the one or more processors to identify a first wireless display and a second wireless display from a plurality of wireless display devices. Additionally, the computer-readable medium may include instructions to request the first wireless display and the second wireless display to emit respective inaudible audio signals. Moreover, the computer-readable medium may include instructions to receive the respective inaudible audio signals from the first wireless display and the second wireless display and determine, based at least in part on the respective inaudible audio signals, that the first wireless display is in the same room as the device.

The above principles, as well as perhaps others, are now illustrated with reference to FIG. 1, which depicts a system 100 for wireless display discovery. The system 100 may include a first user device 102 having one or more computer processors 104, a memory 106, which may store a communication application 108, a radio transceiver 110, a second radio transceiver 112, network and input/output (I/O) interfaces 114, a display 116, and a microphone in communication with each other. The system 100 may also include a wireless display device 122 having one or more computer processors 124, a memory 126, a first radio transceiver 128, a second radio transceiver 130, a network and input/output (I/O) interface display 134, and an acoustic emitter 136 in communication with each other. In general, as will be described below, the second radio transceiver 112 of the user device 102 may communicate with second radio transceiver 130 of the wireless display device(s) 122 detect whether the wireless display device(s) 122 is/are in the same room as the user device. If a wireless display device 122 is determined to be in the same room as the user device 102, the first radio transceiver 110 of the user device 102 may communicate with the first radio transceiver 128 of the wireless display device 122 to establish a streaming wireless display connection. Furthermore, it will be appreciated that all radio transceivers described with respect to the user device 102 and wireless display device(s) 122 may be configured to receive and/or transmit any type of radio signals (e.g., WiFi radio signals, Bluetooth radio signals, Bluetooth Low-Energy radio signals, etc.).

The computer processors 104/124 may comprise one or more cores and may be configured to access and execute (at least in part) computer-readable instructions stored in the memory 106/126. The one or more computer processors 104/124 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104/124 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/126 may comprise one or more computer-readable storage media (CRSM). In some embodiments, the memory 106/126 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including as transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/126 may store an operating system that includes a plurality of computer-executable instructions that may be implemented by the computer processor 104/124 to perform a variety of tasks to operate the interface(s) and any other hardware installed on the user device 102. The memory 106/126 may also store content that may be displayed by the user device 102 or transferred to other devices (e.g., headphones) to be displayed or played by the other devices. The memory 106/126 may also store content received from the other devices. The content from the other devices may be displayed, played, or used by the user device 102 to perform any necessary tasks or operations that may be implemented by the computer processor 104/124 or other components in the user device 102/122.

The network and I/O interfaces 114/134 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see *IEEE* 802.11-2012, published Mar. 29, 2012), the Bluetooth standard, or any other wireless standard and/or a combination thereof. The wireless system (not shown) may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 120 may include, but is not limited to: the Internet, a private network, a virtual private network, a wireless wide area network, as local area network, a metropolitan area network, a telephone network, and so forth.

The display 116/134 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

Broadly, a user of the user device 102 may wish to automatically establish a wireless display connection with a wireless display device 122 in the same room as the user device 102. However, the user device 102 may be capable of detecting the presence of multiple wireless display devices. Therefore, according to embodiments described herein, systems and methods are provided that facilitate the identification of a wireless display device 122, among a plurality of wireless display devices, that is in the same room as the user device 102.

For example, the wireless display devices 122 may be configured to periodically advertise and/or broadcast their presence to other wireless devices, such as the user device 102. Additionally, the user device 102 may receive an indication front the user (not pictured) to search and/or otherwise detect the presence of wireless display devices 122. For example, a user may press a button, interact with a user interface on the display 116, and/or otherwise indicate to the user device 102/communication application 108 to initiate detection of wireless display device 122. In response, the communication application 108 of the user device 102 may be configured to detect one or more wireless display devices 122 via the second radio transceiver 112. In certain embodiments, the second radio transceiver 112 may be a Bluetooth Low-Energy transceiver.

According to one or more embodiments, the user device 102 may detect (e.g., via the second radio transceiver's 112 detection of broadcast signals by respective second radio transceivers 130 on the wireless display device(s) 122) the presence of multiple wireless display devices 122. Furthermore, the communication application 108 may be configured to determine respective received signal strength indications (RSSIs) associated with the wireless display devices 122. To this end, the communication application 108 may identify wireless display devices associated with RSSIs above a predetermined RSSI threshold, which may provide an estimation of which wireless display devices 122 (e.g., the wireless display devices so identified) may possibly be in the same room as the user device 102. As such, the communication application 108 may be configured to transmit respective connection requests (e.g., via the second radio transceiver 112) to the identified wireless display devices.

In response, the identified wireless display devices may be configured to respectively transmit a connection response to the user device 102 (e.g., via the second radio transceiver 130 to the second radio receiver 112 of the user device 102). In some implementations, the connection responses may include wireless address identifiers and inaudible audio signal identifiers. For example, each of the identified wireless display devices may be associated with a wireless address identifier and an inaudible audio signal identifier. The wireless address identifier and the inaudible audio signal identifier may be further be associated with each other. Moreover, each of the identified wireless display devices may be configured to transmit their respective wireless address identifiers and inaudible audio signal identifiers in their connection responses to the user device 102. According to some embodiments, a wireless address identifier may include a Wi-Fi Media Access Control (MAC) address.

The communication application 108 may further be configured to transmit instructions (e.g., via the second radio transceiver 112), to the identified wireless display devices, to send/emit inaudible audio signals. In response, the identified wireless display devices may be configured to emit (e.g., via their respective acoustic emitters 136) inaudible audio signals to the user device 102. According to certain embodiments, the inaudible audio signals may be ultrasound audio signals associated with a frequency of 20 kilohertz or above. Upon transmission of the inaudible audio signals, the microphone 118 included in the user device 102 may be configured receive the inaudible audio signals. Additionally, each of the inaudible audio signals may include respective signature information that may correspond to respective inaudible audio signal identifiers.

In some implementations, the communication application 108 of the user device 102 may be configured to determine signal-to-noise ratio information associated with each of the inaudible audio signals transmitted by the identified wireless display devices. As such, the communication application 108 may determine a predetermined ratio. To this end, if the communication application 108 determines that a particular signal-to-noise ratio information exceeds the predetermined ratio, this scenario indicates that a particular inaudible audio signal (e.g., the inaudible audio signal associated with the particular signal-to-noise ratio information) was emitted by a wireless display device from the same room in which the user device 102 is present. Furthermore, the communication application 108 may be configured to determine, based at least in part on the signature information associated with the particular inaudible audio signal, the corresponding inaudible audio signal identifier. As a result, the communication application 108 may also be able to identify the wireless address identifier associated with the determined inaudible audio signal identifier. To this end, communication application 108 may be configured to establish, based at least in part on the wireless address identifier (and via the first radio transceiver 110), a streaming wireless display connection with the wireless display device 102 associated with the wireless address identifier.

In yet other implementations, in order to determine the wireless display device 122 in the same room as the user device 102, the user device may instead communicate with one or more room beacon devices (not illustrated). As such, the room beacon devices may be configured to included similar components as the wireless display devices 122, such as the first radio transceiver 128, the second radio transceiver 130, the acoustic emitter 136, and/or the like. To this end, the user device 102 may communicate with the room beacon devices in a similar manner as described above with respect to the wireless display device(s) 122.

For example, the user device 102 may detect (e.g., via the second radio transceiver 112) one or more room beacon devices, which may be configured to periodically broadcast advertisement signals similar to the wireless display devices 122. Based on certain RSSI thresholds, the user device 102 may identify certain room beacon devices to which connection requests are transmitted (e.g., via the second radio transceiver 112). In response, the identified room beacon devices may be configured transmit connection responses which may include respective room identifiers and respective inaudible audio signal identifiers.

Upon establishing a connection with the room beacon devices, the user device 102 may transmit instructions to the room beacon devices to emit inaudible audio signals (e.g., via their respective acoustic emitters). The user device 102 may receive the inaudible audio signals at the microphone 118 and identify a particular inaudible audio signal associated with a signal-to-noise ratio above a predetermined ratio. To this end, the user device 102 may examine the particular inaudible audio signal to determine signature information. The user device 102 may identify an inaudible audio signal identifier that matches the signature information. As discussed of inaudible audio signal identifier may be associated with as particular room identifier (e.g., they were sent as connection responses from the room beacon devices). As such, based on the room identifier, the user device 102 may determine the room in which the user device 102 current resides.

Furthermore, a database (not illustrated) may be in communication with the user device 102, such as via the network(s) 120. The database may store relationships between room identifiers and wireless address identifiers associated with respective wireless display devices 122. Thus, if a particular wireless display device 122 is located in a particular room, the database may store information that associates the room identifier of the particular room with the wireless address identifier of the particular wireless display device 122. Therefore, upon determination of the room identifier from the inaudible audio signal received from the identified room beacon device, the user device 102 may be configured to access the database. The user device 102 may use the room identifier to determine the corresponding wireless address identifier associated with the wireless display device 122. The wireless display device 122 in the same room as the user device 102 may therefore be identified. As such the user device 102 may establish a streaming wireless display connection (e.g., via the first radio transceiver 128) with the identified wireless display device 122.

It will be appreciated that while FIG. 1 illustrates various components as being included within the wireless display device(s) 122, any of the components may also be included as a peripheral device in communication with the wireless display device(s) 122. For example, the first radio transceiver 128 and/or the second radio transceiver 130 may be included in one or more peripheral devices in communication with the wireless display device(s) 122. In addition, greater and/or fewer components included in the user devices 102 and wireless display device(s) 122 are also contemplated. For example, the wireless display devices may not included any processing capabilities (e.g., the wireless display device(s) 122 may not included processor(s) 124) and may simply be configured as slave devices to the user device 102. As another example, the user device 102 may not include a display and may thus rely on a streaming wireless display connection with one or more wireless display device 122.

Furthermore, it will be appreciated that though references have been made to the user device 102 detecting a plurality of wireless display devices, the systems and methods described herein may also apply to a single wireless display device 122 as well. For example, the user device 102 may be configured to establish a connection with a single display device 122 and determine, via the communication of inaudible audio signals as described above, a wireless address identifier associated with the single display device. Additionally it will be appreciated that the operations of the first radio transceiver 110 and the second radio transceiver 112 of the user device 102 may be combined into a single radio transceiver. Similarly, the operations of the first radio transceiver 128 and the second radio transceiver 130 of the wireless display device(s) 122 may also be combined into a single radio transceiver.

Figure 2:
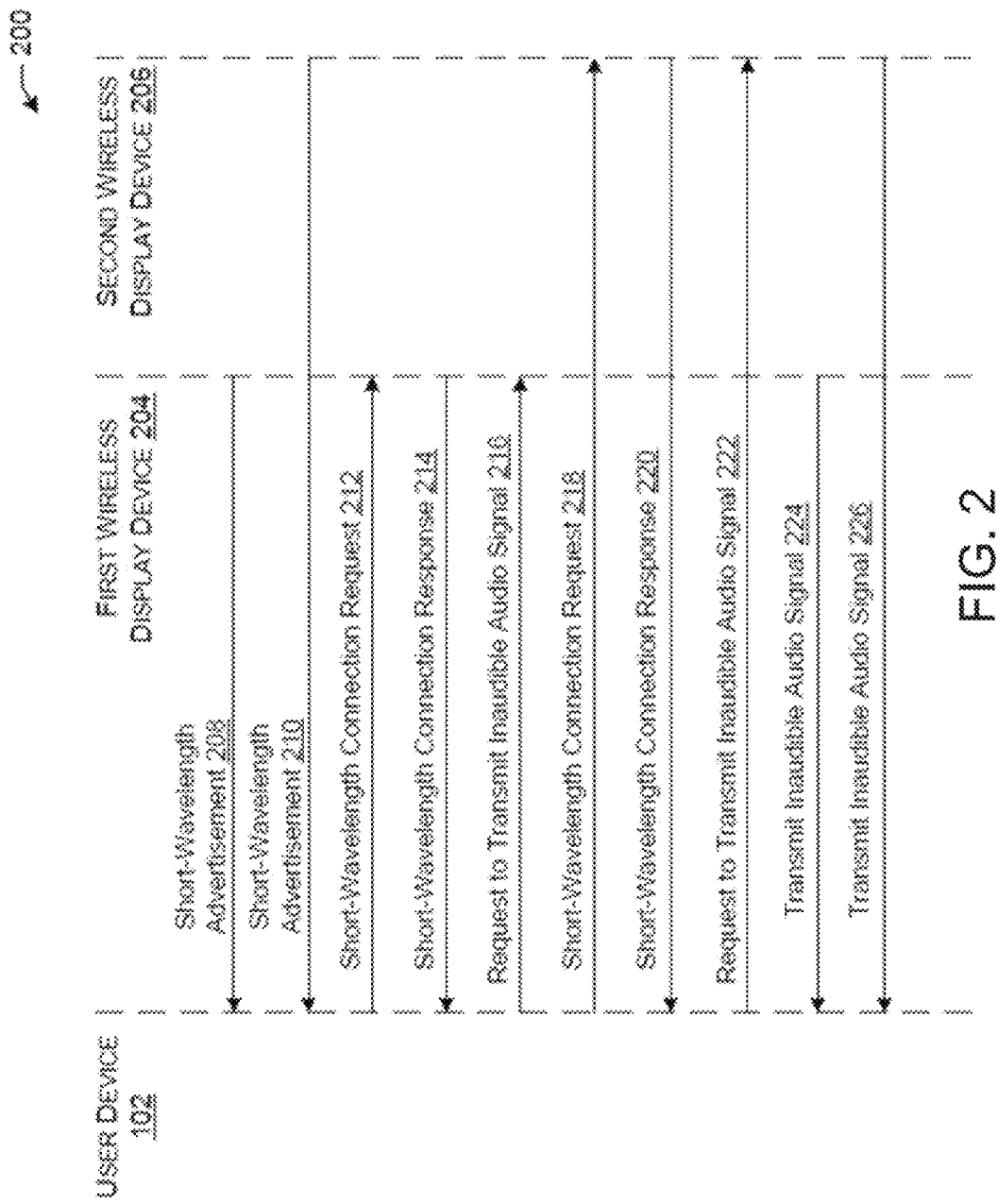
FIG. 2 shows a data flow diagram for wireless display discovery, according to one or more example embodiments.

FIG. 2 provides a diagram illustrating a data flow 200 between a user device 102, a first wireless display device 204, and a second wireless display device 206 in accordance with one or more example embodiments. The data flow 200 may describe a process by which the user device 102 may employ to discover a wireless display device in the same room as the user device 102. For purposes of illustration only, the data flow 200 may operate under the assumption that the first wireless display device 204 resides in the some room as the user device 102 while the second wireless display device 206 resides in a different from the user device 102.

In accordance with one or more embodiments of the data flow 200, the first wireless display device 204 and the second wireless display device 206 may be configured to periodically transmit/broadcast short-wavelength advertisements 208/210. For example, the short-wavelength advertisements 208/210 may be Bluetooth radio signals, Bluetooth Low-Energy radio signals, and/or the like. For example, the user device 102 may be configured to receive the short-wavelength advertisements 208/210 upon an indication from a user to initiate detection of wireless display devices.

Upon receipt of the short-wavelength advertisement 208 from the first wireless display device 204, the user device 102 may be configured to transmit a short-wavelength connection request 212 to the first wireless display device 204. The first wireless display device 204 may then be configured to transmit a short-wavelength connection response 214 back to the user device 102. In certain embodiments, the connection response 214 may include a first wireless address identifier and a first inaudible audio signal identifier associated with the first wireless display device 204. The first wireless address identifier and the first inaudible audio signal identifier may further be linked and/or otherwise associated with each other. In addition, the connection response 214 may also include an acknowledgement of the connection request 212. The user device 102 may then request that the first wireless display device 204 transmit a first audible audio signal 216. In response, the first wireless display device 204 may transmit the first inaudible audio signal 224 to the user device 102 (e.g., which may be received by a microphone of the user device 102).

Similar communication may also be performed between the user device 102 and the second wireless display device 206. For example, upon receipt of the short-wavelength advertisement 210 from the second wireless display device 206, the user device 102 may be configured to transmit a short-wavelength connection request 218 to the second wireless display device 206. The second wireless display device 206 may then be configured to transmit a short-wavelength connection response 220 back to the user device 102. In certain embodiments, the connection response 220 may include a second wireless address identifier and a second inaudible audio signal identifier associated with the second wireless display device 206. The second wireless address identifier and the second inaudible audio signal identifier may further be linked and/or otherwise associated with each other. In addition, the connection response 220 may also include an acknowledgement of the connection request 218. The user device 102 may then request that the second wireless display device 206 transmit a second inaudible audio signal 222. In response, the second wireless display device 206 may transmit the second inaudible audio signal 226 to the user device 102 (e.g., which may be received by a microphone of the user device 102).

It will be appreciated that the data flow 200 illustrated in FIG. 2 is not limited to any particular sequence and that communication between the user device 102, the first wireless display device 204, and the second wireless display device 206 may be interleaved in any combination. For example, in some implementations, the transmissions of the inaudible audio signals 224/226 may occur approximately simultaneously in order to reduce the recording time of the microphone 118 on the user device 102. Alternatively, the transmission of the inaudible audio signal 224 from the first wireless display device 204 may immediately follow the first wireless display device's 204 receipt of the transmission request 216. Similarly, the transmission of the inaudible audio signal 226 may immediately follow the second wireless display device's 206 receipt of the transmission request 222.

Furthermore, it will be appreciated that while FIG. 2 has been described with references to short-wavelength radio signals (e.g., short-wavelength advertisements 208/210, short-wavelength connection requests 212/218, and short-wavelength responses 214/220), such references are for exemplary purposes only. Indeed, any type of radio signals are also contemplated and may be transmitted and/or received as advertisements, connection requests, and/or connection responses. Additionally, it will be appreciated that the illustrated advertisements, connection requests, and/or connection responses may be performed prior to establishing a streaming wireless display connection with one or more of the first wireless display device 204 and/or the second wireless display device 206. For example, based at least in part on the first and second inaudible audio signals 224/226, the user device 102 may determine which, if any, of the wireless display device 204 and the second wireless display device 206 is located in the same room as the user device 102. As a result, the user device 102 may establish a streaming wireless display connection with the identified wireless display device. In certain implementations, such a streaming wireless display connection may be established automatically by the communication application 108 of the user device 102. In other implementations, such a connection may be established at a user's selection and/or input.

Figure 3:
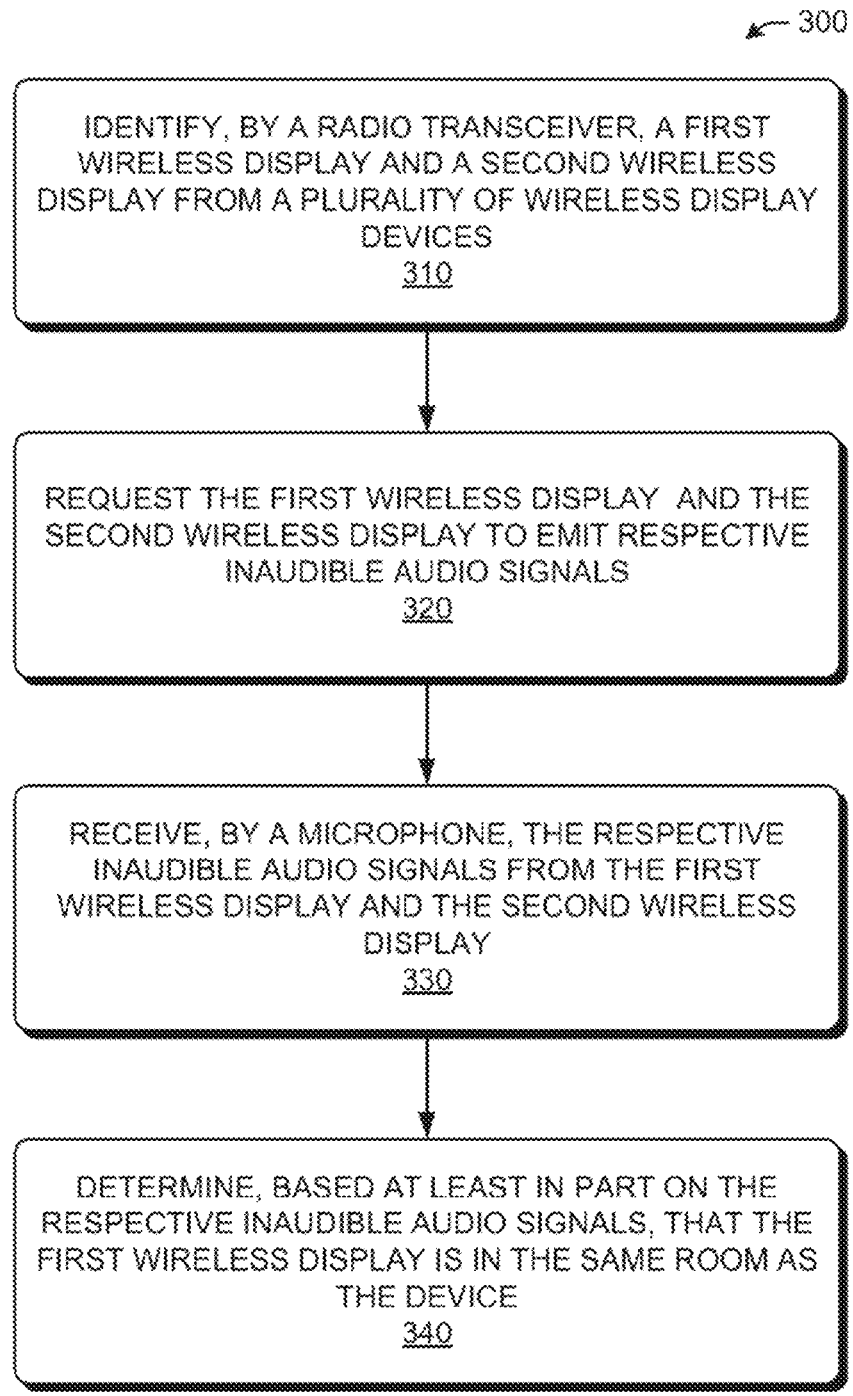
FIG. 3 shows a flow diagram for wireless display discovery, according to one or more example embodiments.

Referring now to FIG. 3, a flow diagram of a method 300 is illustrated for wireless display discovery in accordance with one or more example embodiments. The method 300 may provide a general operation of identifying a wireless display device in the same room as a user device. As such, the method 300 may begin in block 310, identify, by a radio transceiver, a first wireless display and a second wireless display from a plurality of wireless display devices. In block 320, the user device 102 may request that the first wireless display and the second wireless display emit respective inaudible audio signals. In certain implementations, such a request may be transmitted using short-wavelength radio signals, such as Bluetooth signals and/or Bluetooth Low-Energy signals. In block 330, the user device 102 may receive (e.g., via a microphone 118) the respective inaudible audio signals from the first wireless display and the second wireless display. In block 340, the user device 102 may be configured to determine, based at least in part on the respective inaudible audio signals, that the first wireless display is in the same room as the user device 102. As a result, the user device 102 may be configured to establish (e.g., via the communication application 108) a streaming wireless display connection with the first wireless display.

Figure 4:
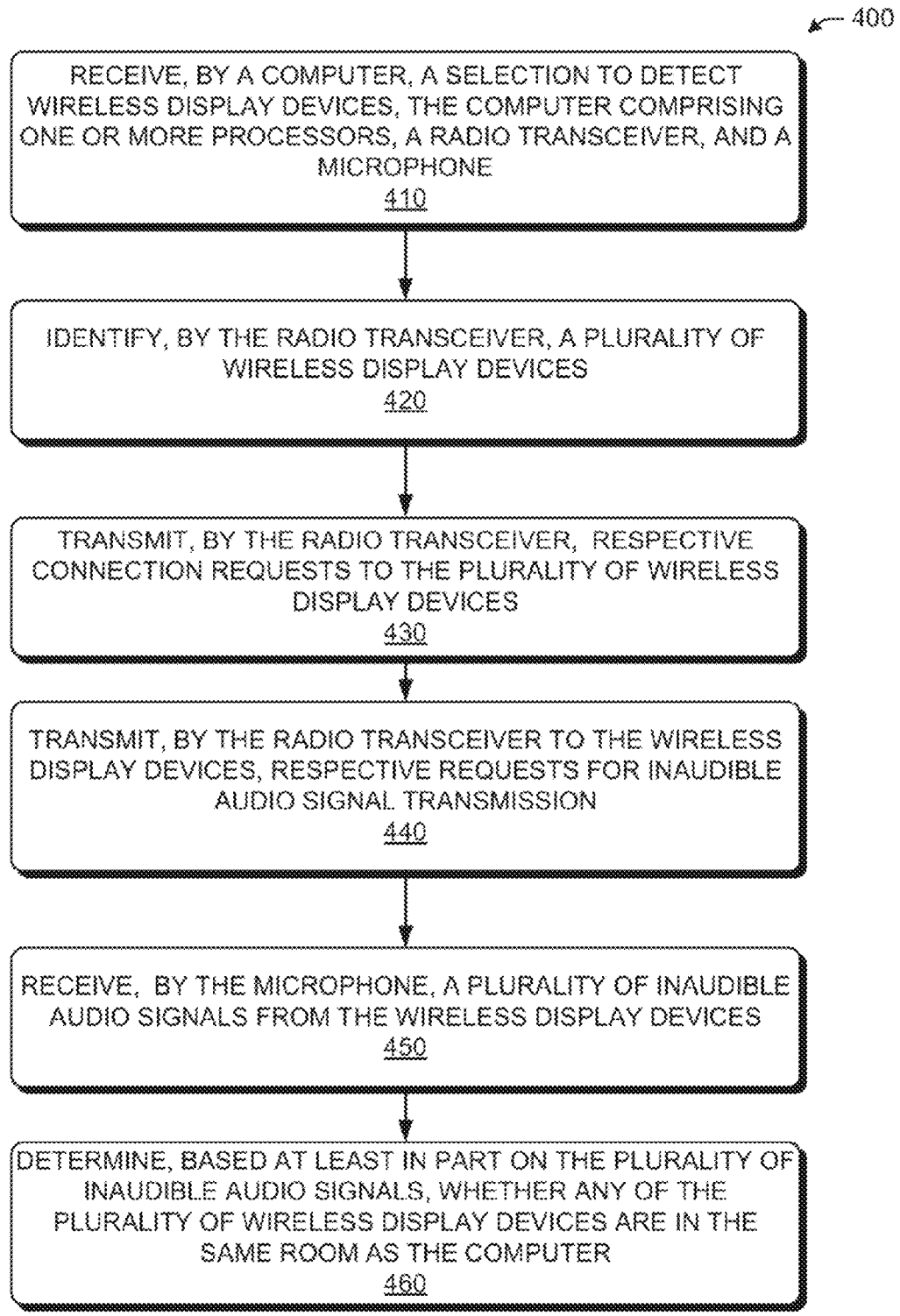
FIG. 4 shows a flow diagram for wireless display discovery, according to one or more example embodiments.

Referring now to FIG. 4, a flow diagram of a method 400 is illustrated depicting wireless display discovery in accordance with one or more example embodiments. The method 400 may begin in block 410, where a computer, such as a user device 102, may receive a selection to detect wireless display devices. Additionally, the user device 102 may include one or more processors, a radio transceiver and a microphone. In block 420, the user device 102 may be configured to identify, by the radio transceiver, a plurality of wireless display devices 420.

In block 430, the user device 102 may be configured to transmit, by the radio transceiver, respective connection requests to the plurality of wireless display devices. Furthermore, in block 440, the user device 102 may be configured to transmit, by the radio transceiver to the wireless display devices, respective requests for inaudible audio signal transmissions. In certain implementations, the requests described in block 430 and/or block 440 may be transmitted using short-wavelength radio signals, such as Bluetooth signals and/or Bluetooth Low-Energy signals. As such, in block 450, the user device 102 may be configured to receive, by the microphone, a plurality of inaudible audio signals from the wireless display devices. In block 460, the user device 102 may be capable of determining, based at least in part on the plurality of inaudible audio signals, whether any of the plurality of wireless display devices are in the same room as the user device 102. As a result, the user device 102 may be configured to establish (e.g., via the communication application 108) a streaming wireless display connection with a wireless display device that is identified as being located in the same room as the user device 102.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct as computer or other programmable data processing apparatus to function in as particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples

Example 1 is a method for wireless display communication, comprising receiving, by a computer, a selection to detect wireless display devices, the computer comprising one or more processors, a radio transceiver, and a microphone; identifying, by the radio transceiver, a plurality of wireless display devices; transmitting, by the radio transceiver, respective connection requests to the plurality of wireless display devices; transmitting, by the radio transceiver to the wireless display devices, respective requests for inaudible audio signal transmission; receiving, by the microphone, a plurality of inaudible audio signals from the wireless display devices; and determining, based at least in part on the plurality of inaudible audio signals, whether any of the plurality of wireless display devices are in the same room as the computer.

In Example 2, the subject matter of Example 1 can optionally include determining that a respective wireless display device, of the plurality of wireless displays, is in the same room as the computer; and establishing a streaming wireless display connection between the computer and the respective wireless display device In Example 3, the subject matter of Example 2 can optionally include that determining that the respective wireless display device is in the same room as the computer further comprises: receiving, from the respective wireless display, a wireless address identifier associated with an inaudible audio signal identifier determining respective signal-to-noise information associated with plurality of inaudible audio signals; determining, based at least in part on the respective signal-to-noise information, that a respective inaudible audio signal, of the plurality of inaudible audio signals, was transmitted from inside the room; and determining that the respective inaudible audio signal comprises an identifier that matches the inaudible audio signal identifier associated with the respective wireless display In Example 4, the subject matter of Example 3 can optionally include determining, based at least in part on the inaudible audio signal identifier, the wireless address identifier associated with the respective wireless display device; and establishing the streaming wireless display connection with the wireless display device based at least in part on the wireless address identifier In Example 5, the subject matter of Example 1 can optionally include that the radio transceiver is a Bluetooth Low-Energy transceiver Example 6 is a device for wireless display communication comprising: a radio transceiver; a microphone; at least one processor; and at least one memory storing computer-executable instructions, that when executed by the at least one processor, causes the at least one processor to: identify, by the radio transceiver, a first wireless display and a second wireless display from a plurality of wireless display devices; request the first wireless display and the second wireless display to emit respective inaudible audio signals; receive, by the microphone, the respective inaudible audio signals from the first wireless display and the second wireless display; and determine, based at least in part on the respective inaudible audio signals, that the first wireless display is in the same room as the device In Example 7, the subject matter of Example 6 can optionally include that the computer-executable instructions to identify the first wireless display and the second wireless display further comprises computer-executable instructions that cause the at least one processor to: receive respective received signal strength indications (RSSI) from the plurality of wireless display devices; and determine that the RSSI associated with the first wireless display and the RSSI associated with the second wireless display are above a predetermined threshold.

In Example 8, the subject matter of Example 6 can optionally include that the computer-executable instructions further cause the at least one processor to: determine, for the respective audible audio signals, respective signal-to-noise information.

In Example 9, the subject matter of Example 8 can optionally include that the computer-executable instructions to determine that the first wireless display is in the same room further comprise instructions that cause the at least one processor to: determine that a first signal-to-noise information, of the respective signal-to-noise information, is above a predetermined threshold; determine that the first signal-to-noise information is associated with a first inaudible audio signal received by the microphone; and determine that the first inaudible audio signal is emitted by the first wireless display.

In Example 10, the subject matter of Example 9 can optionally include that the computer-executable instructions to determine that the first inaudible audio signal is emitted by the first wireless display further comprises instructions that cause the at least one processor to: receive, from the first wireless display, a wireless address identifier associated with an inaudible audio signal identifier; determine audio signature information associated with the first inaudible audio signal; and determine that the inaudible audio signal identifier matches the audio signature information.

In Example 11, the subject matter of example 10 can optionally include that the computer-executable instructions further cause the at least one processor to: determine, based at least in part on the association between the wireless address identifier and the inaudible audio signal identifier, that the wireless address identifier corresponds to the first wireless device; and establish, based at least in part on the wireless address identifier, a streaming wireless display connection with the first wireless display.

In Example 12, the subject matter of Example 11 can optionally include that the wireless address identifier is as Wi-Fi Media Access Control address.

In Example 13, the subject matter of Example 6 can optionally include that the radio transceiver is a Bluetooth Low-Energy transceiver.

Example 14 is a non-transitory computer-readable medium comprising instructions, that when executed by at least one processor, cause the at least one processor to: identify a first wireless display and a second wireless display from a plurality of wireless display devices; request the first wireless display and the second wireless display to emit respective inaudible audio signals; receive the respective inaudible audio signals from the first wireless display and the second wireless display; and determine, based at least in part on the respective inaudible audio signals, that the first wireless display is in the same room as the device.

In Example 15, the subject matter of Example 14 can optionally include that the computer-executable instructions to identify the first wireless display and the second wireless display further comprises computer-executable instructions that cause the at least one processor to: receive respective received signal strength indications (RSSI) from the plurality of wireless display devices; and determine that the RSSI associated with the first wireless display and the RSSI associated with the second wireless display are above a predetermined threshold.

In Example 16, the subject matter of Example 14 can optionally include that the computer-executable instructions further cause the at least one processor to: determine, for the respective inaudible audio signals, respective signal-to-noise information.

In Example 17, the subject matter of Example 16 can optionally include that the computer-executable instructions to determine that the first wireless display is in the same room further comprise instructions that cause the at least one processor to: determine that a first signal-to-noise information, of the respective signal-to-noise information, is above a predetermined threshold; determine that the first signal-to-noise information is associated with a first inaudible audio signal received by the microphone; and determine that the first inaudible audio signal is emitted by the first wireless display.

In Example 18, the subject matter of Example 17 can optionally include that the computer-executable instructions to determine that the first inaudible audio signal is emitted by the first wireless display further comprises instructions that cause the at least one processor to: receive, from the first wireless display, a wireless address identifier associated with an inaudible audio signal identifier; determine audio signature information associated with the first inaudible audio signal; and determine that the inaudible audio signal identifier matches the audio signature information.

In Example 19, the subject matter of Example 18 can optionally include that the computer-executable instructions further cause the at least one processor to: determine, based at least in part on the association between the wireless address identifier and the inaudible audio signal identifier, that the wireless address identifier corresponds to the first wireless device; and establish, based at least in part on the wireless address identifier, a streaming wireless display connection with the first wireless display.

In Example 20, the subject matter of Example 19 can optionally include that the wireless address identifier is a Wi-Fi Media Access Control address.

In Example 21, the subject matter of Example 14 can optionally include that the radio transceiver is a Bluetooth Low-Energy transceiver.

Example 22 is a method for wireless display communication, comprising: receiving, by a computer, a selection to detect a room identifier, the computer comprising one or more processors, a radio transceiver, and a microphone; identifying, by the radio transceiver, a plurality of room beacon devices; transmitting, by the radio transceiver, respective connection requests to the plurality of room beacon devices; transmitting, by the radio transceiver to the room beacon devices, respective requests for inaudible audio signal transmission; receiving, by the microphone, a plurality of inaudible audio signals from the room beacon devices; and determining, based at least in part on the plurality of inaudible audio signals, a room identifier corresponding to a room in which the computer resides.

In Example 23, the subject matter of Example 22 can optionally include determining, based at least in part on the room identifier a wireless display identifier associated with a wireless display device in the room in which the computer resides.

In Example 24, the subject matter of Example 22 can optionally include establishing streaming wireless display connection between the computer and the wireless display device.

Example 25, apparatus for wireless display communication, comprising: means for receiving a selection to detect wireless display devices; means for identifying a plurality of wireless display devices; means for transmitting respective connection requests to the plurality of wireless display devices; means for transmitting, to the wireless display devices, respective requests for inaudible audio signal transmission; means for receiving a plurality of inaudible audio signals from the wireless display devices; and means for determining, based at least in part on the plurality of inaudible audio signals, whether any of the plurality of wireless display devices are in the same room as the computer.

In Example 26, the subject matter of Example 25 can optionally include means for determining that a respective wireless display device, of the plurality of wireless displays, is in the same room as the computer; and means for establishing a streaming wireless display connection between the computer and the respective wireless display device.

In Example 27, the subject matter of Example 26 can optionally include that the means for determining that the respective wireless display device is in the same room as the computer further comprises: means for receiving, from the respective wireless display, a wireless address identifier associated with an inaudible audio signal identifier; means for determining respective signal-to-noise information associated with plurality of inaudible audio signals; means for determining, based at least in part on the respective signal-to-noise information, that as respective inaudible audio signal, of the plurality of inaudible audio signals, was transmitted from inside the room; and means for determining that the respective inaudible audio signal comprises an identifier that matches the inaudible audio signal identifier associated with the respective wireless display.

In Example 28, the subject matter of Example 27 can optionally include means for determining, based at least in part on the inaudible audio signal identifier, the wireless address identifier associated with the respective wireless display device; and means for establishing the streaming wireless display connection with the wireless display device based at least in part on the wireless address identifier.

In Example 29, the subject matter of Example 25 can optionally include that the radio transceiver is a Bluetooth Low-Energy transceiver.

Example 30, is a device for wireless display communication, comprising: a radio transceiver; a microphone; at least one processor; and at least one memory storing computer-executable instructions, that when executed by the at least one processor, causes the at least one processor to: receive, by the radio transceiver, a selection to detect a room identifier; identify, by the radio transceiver, a plurality of room beacon devices transmit, by the radio transceiver, respective connection requests to the plurality of room beacon devices; transmit, by the radio transceiver to the room beacon devices, respective requests for inaudible audio signal transmission; receive, by the microphone, a plurality of inaudible audio signals from the room beacon devices; and determine, based at least in part on the plurality of inaudible audio signals, a room identifier corresponding to a room in which the computer resides.

In Example 31, the subject matter of Example 30 can optionally include further computer-executable instructions that cause the at least one processor to: determine, based at least in part on the room identifier, a wireless display identifier associated with a wireless display device in the room in which the computer resides.

In Example 32, the subject matter of Example 30 can optionally include further computer-executable instructions that cause the at least one processor to: establish a streaming wireless display connection between the device and the wireless display device.

Example 33 is an apparatus for wireless display communication. The apparatus can optionally include a first radio transceiver to: receive a connection request from a user device; transmit, to the user device, a connection response comprising a wireless address identifier and an in audible audio signal identifier; and receive, from the user device, a second request to transmit an inaudible audio signal; an acoustic emitter to emit, in response to the second request, the inaudible audio signal; and a second radio transceiver to establish, based at least in part on the in audible audio signal, a streaming wireless display connection with the user device.

What is claimed is:

1. A method, comprising:
receiving, by a computer, a selection to detect wireless display devices, the computer comprising one or more processors, a radio transceiver, and a microphone;
identifying, by the radio transceiver, a plurality of wireless display devices;
transmitting, by the radio transceiver, respective connection requests to the plurality of wireless display devices;
transmitting, by the radio transceiver to the wireless display devices, respective requests for inaudible audio signal transmission;
receiving, by the microphone, a plurality of inaudible audio signals from the wireless display devices; and
determining, based at least in part on the plurality of inaudible audio signals, that at least one of the plurality of wireless display devices is in a same room as the computer, the determining comprising:
receiving, from the wireless display devices, a wireless address identifier associated with an inaudible audio signal identifier,
determining respective signal-to-noise information associated with each of the plurality of inaudible audio signals,
determining, based at least in part on the respective signal-to-noise information, that a respective inaudible audio signal, of the plurality of inaudible audio signals, was transmitted from inside the room, the respective inaudible audio signal associated with the at least one of the plurality of wireless display devices, and
determining that the respective inaudible audio signal comprises an identifier that matches the inaudible audio signal identifier associated with a respective wireless display of the wireless display devices.

2. The method of claim 1, further comprising:
establishing a streaming wireless display connection between the computer and the respective wireless display device.

3. The method of claim 1, further comprising:
determining, based at least in part on the inaudible audio signal identifier, the wireless address identifier associated with the respective wireless display device; and
establishing the streaming wireless display connection with the wireless display device based at least in part on the wireless address identifier.

4. The method of claim 1, wherein the radio transceiver is a Bluetooth Low-Energy transceiver.

5. A device, comprising:
a radio transceiver;
a microphone;
at least one processor; and
at least one memory storing computer-executable instructions, that when executed by the at least one processor, cause the at least one processor to:
identify, by the radio transceiver, a first wireless display and a second wireless display from a plurality of wireless display devices;
request the first wireless display and the second wireless display to emit respective inaudible audio signals;
receive, by the microphone, the respective inaudible audio signals from the first wireless display and the second wireless display; and
determine, based at least in part on the respective inaudible audio signals, that the first wireless display is in a same room as the device, wherein the computer-executable instructions that cause the at least one processor to determine further comprise additional computer-executable instructions that cause the at least one processor to:
receive, from the first wireless display or the second wireless display, a wireless address identifier associated with an inaudible audio signal identifier,
determine respective signal-to-noise information associated with each of the respective inaudible audio signals,
determine, based at least in part on the respective signal-to-noise information, that at least one of the respective inaudible audio signals was transmitted from inside the room, wherein the at least one of the respective inaudible audio signals is associated with the at least one of the plurality of wireless display devices, and determine that the at least one of the respective inaudible audio signals comprises an identifier that matches the inaudible audio signal identifier associated with the first wireless display or the second wireless display.

6. The device of claim 5, wherein the computer-executable instructions to identify the first wireless display and the second wireless display further comprise computer-executable instructions that cause the at least one processor to:

receive respective received signal strength indications (RSSIs) from the plurality of wireless display devices; and determine that the RSSI associated with the first wireless display and the RSSI associated with the second wireless display are above a predetermined threshold.

7. The device of claim 5, wherein the computer-executable instructions further cause the at least one processor to:

determine, for the respective inaudible audio signals, respective signal-to-noise information.

8. The device of claim 7, wherein the computer-executable instructions to determine that the first wireless display is in the same room further comprise instructions that cause the at least one processor to:

determine that a first signal-to-noise information, of the respective signal-to-noise information, is above a predetermined threshold;

determine that the first signal-to-noise information is associated with a first inaudible audio signal received by the microphone; and determine that the first inaudible audio signal is emitted by the first wireless display.

9. The device of claim 8, wherein the computer-executable instructions to determine that the first inaudible audio signal is emitted by the first wireless display further comprise instructions that cause the at least one processor to:

receive, from the first wireless display, a first wireless address identifier associated with a first inaudible audio signal identifier;

determine audio signature information associated with the first inaudible audio signal; and determine that the first inaudible audio signal identifier matches the audio signature information.

10. The device of claim 9, wherein the computer-executable instructions further cause the at least one processor to:

determine, based at least in part on the association between the first wireless address identifier and the first inaudible audio signal identifier, that the first wireless address identifier corresponds to the first wireless display; and establish, based at least in part on the first wireless address identifier, a streaming wireless display connection with the first wireless display.

11. The device of claim 10, wherein the wireless address identifier is a Wi-Fi Media Access Control address.

12. The device of claim 5, wherein the radio transceiver is a Bluetooth Low-Energy transceiver.

13. A non-transitory computer-readable medium comprising instructions, that when executed by at least one processor, cause the at least one processor to:

identify a first wireless display and a second wireless display from a plurality of wireless display devices;

request the first wireless display and the second wireless display to emit respective inaudible audio signals;

receive the respective inaudible audio signals from the first wireless display and the second wireless display; and determine, based at least in part on the respective inaudible audio signals, that the first wireless display is in a same room as the device, wherein the instructions that cause the at least one processor to determine further comprise additional instructions that cause the at least one processor to:

receive, from the first wireless display or the second wireless display, a wireless address identifier associated with an inaudible audio signal identifier, determine respective signal-to-noise information associated with each of the respective inaudible audio signals, determine, based at least in part on the respective signal-to-noise information, that at least one of the respective inaudible audio signals was transmitted from inside the room, wherein the at least one of the respective inaudible audio signals is associated with the at least one of the plurality of wireless display devices, and determine that the at least one of the respective inaudible audio signals comprises an identifier that matches the inaudible audio signal identifier associated with the first wireless display or the second wireless display.

14. The computer-readable medium of claim 13, wherein the computer-executable instructions to identify the first wireless display and the second wireless display further comprise computer-executable instructions that cause the at least one processor to:

receive respective received signal strength indications (RSSIs) from the plurality of wireless display devices; and determine that the RSSI associated with the first wireless display and the RSSI associated with the second wireless display are above a predetermined threshold.

15. The computer-readable medium of claim 13, wherein the computer-executable instructions further cause the at least one processor to:

determine, for the respective inaudible audio signals, respective signal-to-noise information.

16. The computer-readable medium of claim 15, wherein the computer-executable instructions to determine that the first wireless display is in the same room further comprise instructions that cause the at least one processor to:

determine that a first signal-to-noise information, of the respective signal-to-noise information, is above a predetermined threshold;

determine that the first signal-to-noise information is associated with a first inaudible audio signal received by the microphone; and determine that the first inaudible audio signal is emitted by the first wireless display.

17. The computer-readable medium of claim 16, wherein the computer-executable instructions to determine that the first inaudible audio signal is emitted by the first wireless display further comprise instructions that cause the at least one processor to:

receive, from the first wireless display, a wireless address identifier associated with an inaudible audio signal identifier;

determine audio signature information associated with the first inaudible audio signal; and determine that the inaudible audio signal identifier matches the audio signature information.

18. The computer-readable medium of claim 17, wherein the computer-executable instructions further cause the at least one processor to:
- determine, based at least in part on the association between the wireless address identifier and the inaudible audio signal identifier, that the wireless address identifier corresponds to the first wireless device; and
- establish, based at least in part on the wireless address identifier, a streaming wireless display connection with the first wireless display.

19. The computer-readable medium of claim 18, wherein the wireless address identifier is a Wi-Fi Media Access Control address.

20. The computer-readable medium of claim 13, wherein the radio transceiver is a Bluetooth Low-Energy transceiver.

21. A method for wireless display communication, comprising:
- receiving, by a computer, a selection to detect a room identifier, the computer comprising one or more processors, a radio transceiver, and a microphone;
- identifying, by the radio transceiver, a plurality of room beacon devices;
- transmitting, by the radio transceiver, respective connection requests to the plurality of room beacon devices;
- transmitting, by the radio transceiver to the room beacon devices, respective requests for inaudible audio signal transmission;
- receiving, by the microphone, a plurality of inaudible audio signals from the room beacon devices; and
- determining, based at least in part on the plurality of inaudible audio signals, a room identifier corresponding to the room in which the computer resides, the determining comprising:
  - receiving, from the room beacon devices, a wireless address identifier associated with an inaudible audio signal identifier,
  - determining respective signal-to-noise information associated with each of the plurality of inaudible audio signals,
  - determining, based at least in part on the respective signal-to-noise information, that at least one of the plurality of inaudible audio signals was transmitted from inside a room, wherein the at least one of the respective inaudible audio signals is associated with the at least one of the plurality of room beacon devices, and
  - determining that the respective inaudible audio signals comprise an identifier that matches the inaudible audio signal identifier associated with a respective room beacon device of the room beacon devices.

22. The method of claim 21, further comprising:
determining, based at least in part on the room identifier, a wireless display identifier associated with a wireless display device in the room in which the computer resides.

23. The method of claim 21, further comprising:
establishing a streaming wireless display connection between the computer and the wireless display device.

* * * * *